(12) United States Patent
Pyhälammi

(10) Patent No.: US 7,165,224 B2
(45) Date of Patent: Jan. 16, 2007

(54) IMAGE BROWSING AND DOWNLOADING IN MOBILE NETWORKS

(75) Inventor: Seppo Pyhälammi, Helsinki (FI)

(73) Assignee: Nokia Corporation (FI)

( * ) Notice: Subject to any disclaimer, the term of this patent is extended or adjusted under 35 U.S.C. 154(b) by 742 days.

(21) Appl. No.: 10/262,969

(22) Filed: Oct. 3, 2002

(65) Prior Publication Data

US 2004/0066419 A1    Apr. 8, 2004

(51) Int. Cl.
G06F 3/00 (2006.01)
G06F 15/167 (2006.01)
H04M 11/08 (2006.01)

(52) U.S. Cl. ............. 715/748; 715/838; 715/716; 715/864; 709/216; 709/217; 348/333.05; 348/231.2; 455/466; 455/556.1

(58) Field of Classification Search ............ 715/748, 715/838, 716, 717, 738, 739, 864; 709/217, 709/219, 213, 216; 348/231.2, 333.05; 455/466, 556.1, 556.2, 557

See application file for complete search history.

(56) References Cited

U.S. PATENT DOCUMENTS

| | | | |
|---|---|---|---|
| 4,449,248 A | 5/1984 | Leslie et al. | 340/7.36 |
| 5,038,401 A | 8/1991 | Inotsume | 455/92 |
| 5,539,925 A | 7/1996 | Yli-Kotila et al. | 455/38.3 |
| 5,745,860 A | 4/1998 | Kallin | 455/574 |
| 5,761,606 A | 6/1998 | Wolzien | 455/6.2 |
| 5,812,931 A * | 9/1998 | Yuen | 725/123 |
| 5,946,444 A | 8/1999 | Evans et al. | 386/46 |
| 6,172,673 B1 | 1/2001 | Lehtinen et al. | 715/716 |
| 6,230,325 B1 | 5/2001 | Iinuma et al. | 725/110 |
| 6,437,836 B1 | 8/2002 | Huang et al. | 348/734 |
| 6,535,243 B1 * | 3/2003 | Tullis | 348/333.11 X |
| 6,832,102 B1 * | 12/2004 | I'Anson | 455/556.1 |
| 6,895,251 B1 * | 5/2005 | Soh et al. | 455/466 |

(Continued)

FOREIGN PATENT DOCUMENTS

DE    4422015 C1    8/1995

(Continued)

OTHER PUBLICATIONS

Akiwumi Assani et al., "Multi-media Terminal Architecture", Philips Journal of Research, vol. 50, No. 1, Jan. 1996, pp. 169-184.*

(Continued)

*Primary Examiner*—Raymond J. Bayerl
(74) *Attorney, Agent, or Firm*—Banner & Witcoff, Ltd.

(57) ABSTRACT

Systems and methods are provided for browsing miniaturized versions of images stored locally on a mobile device while allowing the associated full-sized image to be transferred to the mobile device as needed. In one embodiment of the invention, a method of viewing an image on the mobile device includes the steps of storing in the mobile device a miniaturized version of an image stored in the mobile device, transferring the image to an external storage device, and deleting the image from the mobile device. In response to the user of the mobile device selecting the miniaturized version of the image, the mobile device sends a wireless message to the external storage device requesting transfer of the full-sized image. The external storage device transfers the full-sized image to the mobile device in a second message and the mobile device is able to display the full-sized image.

51 Claims, 7 Drawing Sheets

U.S. PATENT DOCUMENTS

| | | | |
|---|---|---|---|
| 7,053,951 B1* | 5/2006 | Miller et al. | 348/333.05 |
| 2001/0045985 A1* | 11/2001 | Edwards et al. | 348/231 |
| 2002/0010763 A1 | 1/2002 | Salo et al. | 709/220 |
| 2002/0047916 A1 | 4/2002 | Miyagi et al. | 348/384.1 |
| 2002/0184318 A1* | 12/2002 | Pineau | 709/203 X |
| 2002/0184335 A1* | 12/2002 | Simpson et al. | 709/217 |
| 2003/0081145 A1 | 5/2003 | Seaman et al. | 348/460 |

FOREIGN PATENT DOCUMENTS

| | | |
|---|---|---|
| EP | 0115038 | 8/1984 |
| EP | 0569311 | 11/1993 |
| EP | 0999678 | 5/2000 |
| EP | 1059809 | 12/2000 |
| EP | 1107209 | 6/2001 |
| GB | 2294132 | 4/1996 |
| GB | 2307628 | 5/1997 |
| GB | 2379116 | 2/2003 |
| WO | WO 96/42144 | 12/1996 |
| WO | WO 98/52105 | 11/1998 |
| WO | WO 99/04568 | 1/1999 |
| WO | WO 00/44168 | 7/2000 |
| WO | WO 00/57657 | 9/2000 |
| WO | WO 01/15450 | 3/2001 |
| WO | WO 01/48715 | 7/2001 |
| WO | WO 02/03698 | 1/2002 |
| WO | WO 02/32115 | 4/2002 |
| WO | WO-02/085004 | 10/2002 |
| WO | WO-03/04712 | 6/2003 |

OTHER PUBLICATIONS

Balakrishnan et al., "Digital Video And The National Information Infrastructure", Philips Journal of Research, vol. 500, No. 1, Jan. 1996, pp. 105-129.

Salkintzis et al., "An In-Band Power-Saving Protocol For Mobile Data Networks", IEEE Transactions on Communications, vol. 46, No. 9, Sep. 1998, pp. 1194-1205.

Salkintzis et al., "Performance Analysis Of A Downlink MAC Protocol With Power-Saving Support", IEEE Transactions on Vehicular Technology, vol. 49, No. 3, May 2002, pp. 1029-1040.

Datenrundfunk mit DAB, Technik, 202 Funkschau, Oct. 1995.

"Datenrundfunk mit DAB", Technik, 202 Funkschau, Oct. 13, 1995, Poing, DE, pp. 45-48.

Complete translation into English of pp. 45-48 of "Datenrundfunk mit DAB" entitled :Data Broadcasting With DAB, Technology, 202 Funkschau, Oct. 13, 1995, Poing, Germany.

English language Abstract of pp. 45-48 of "Datenrundfunk mit DAB" Technik, 202 Funkschau, Oct. 13, 1995, Poing, DE.

"Wireless Transfer Of Images From a Digital Camera To The Internet Via A Standard GSM Mobile Phone", IEEE Transactions on Consumer Electronics, vol. 47, No. 3, Aug. 2001, pp. 542-547.

ETSI TS 123 140 V4.2.0 (2001-2003).

* cited by examiner

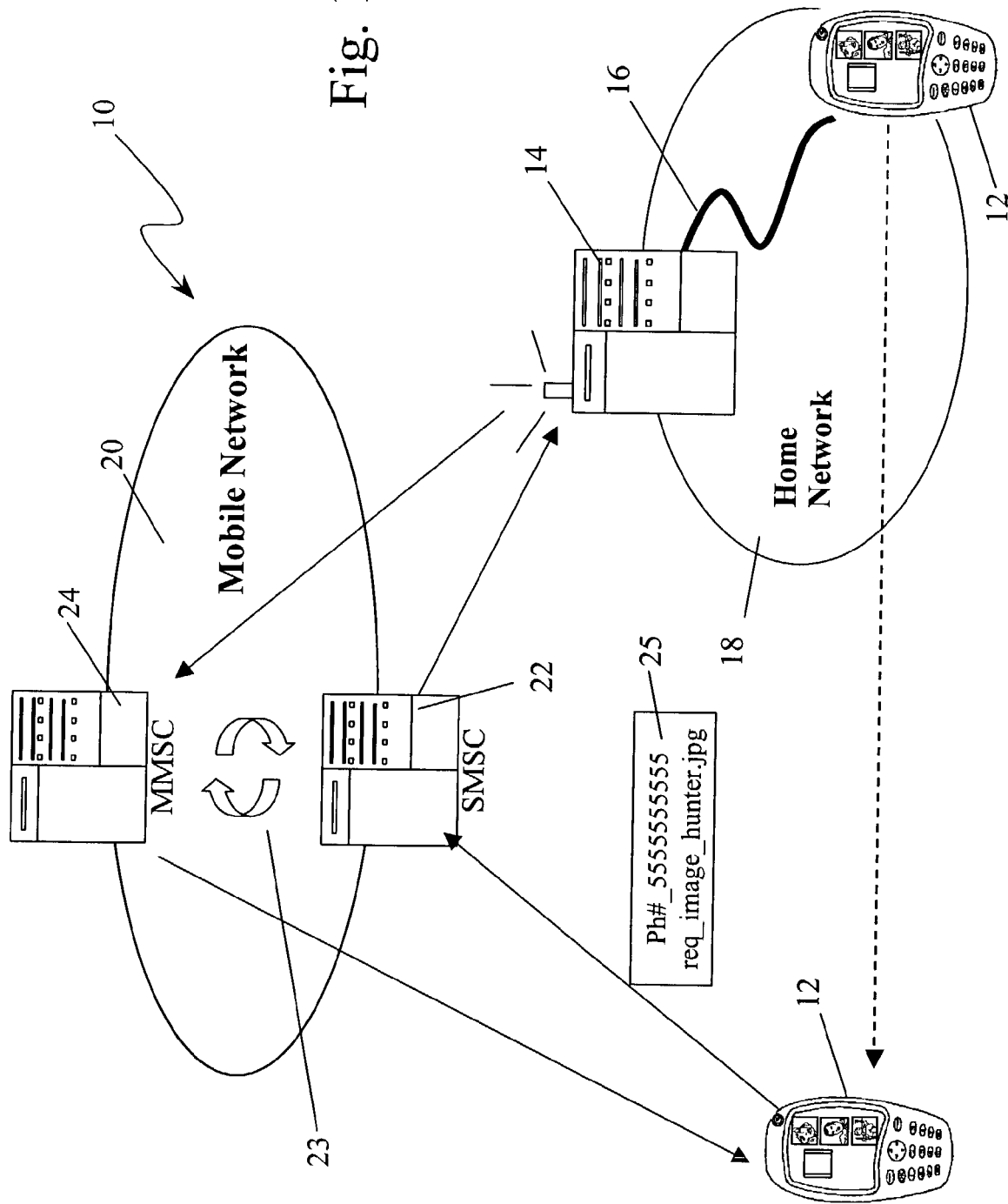

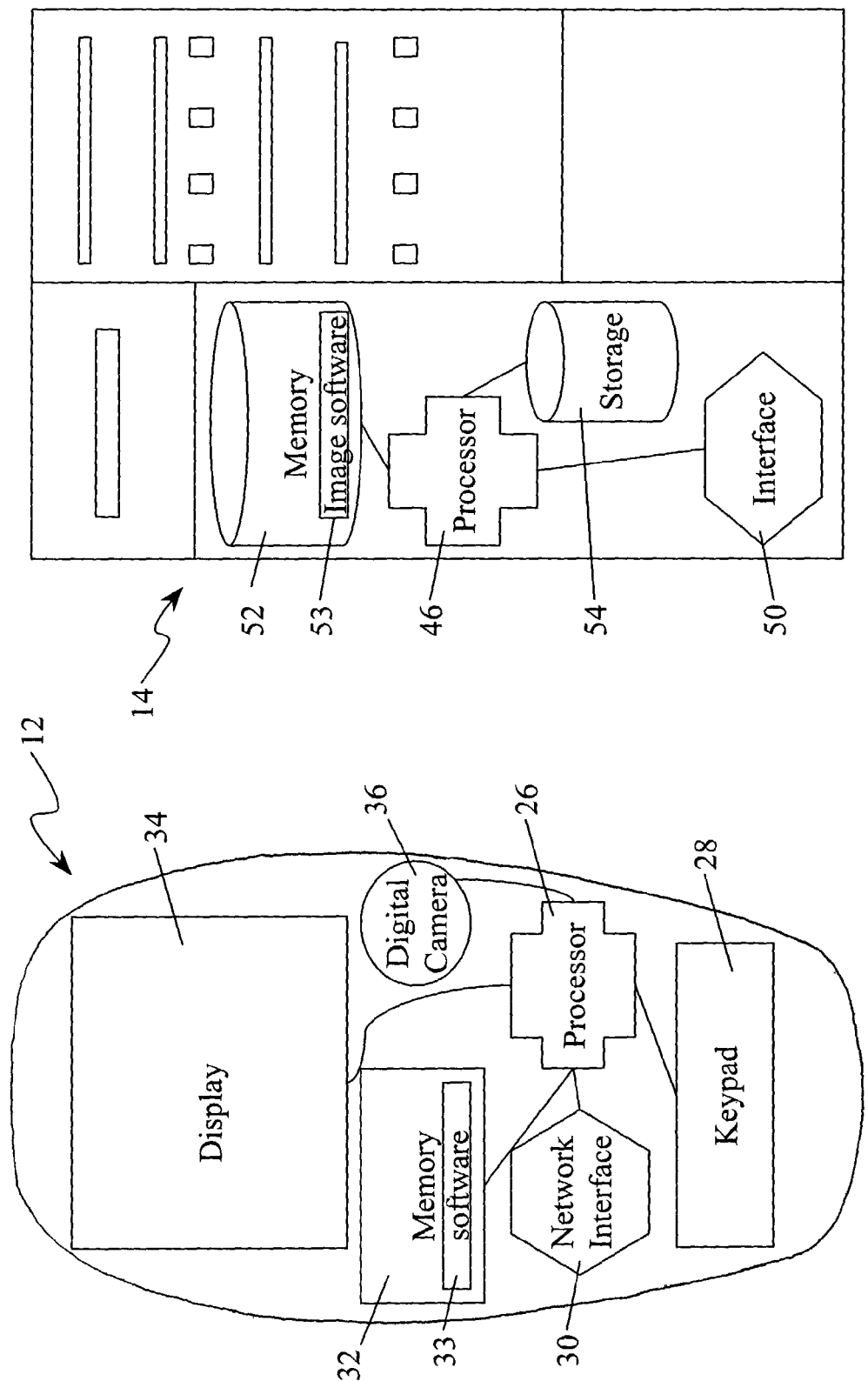

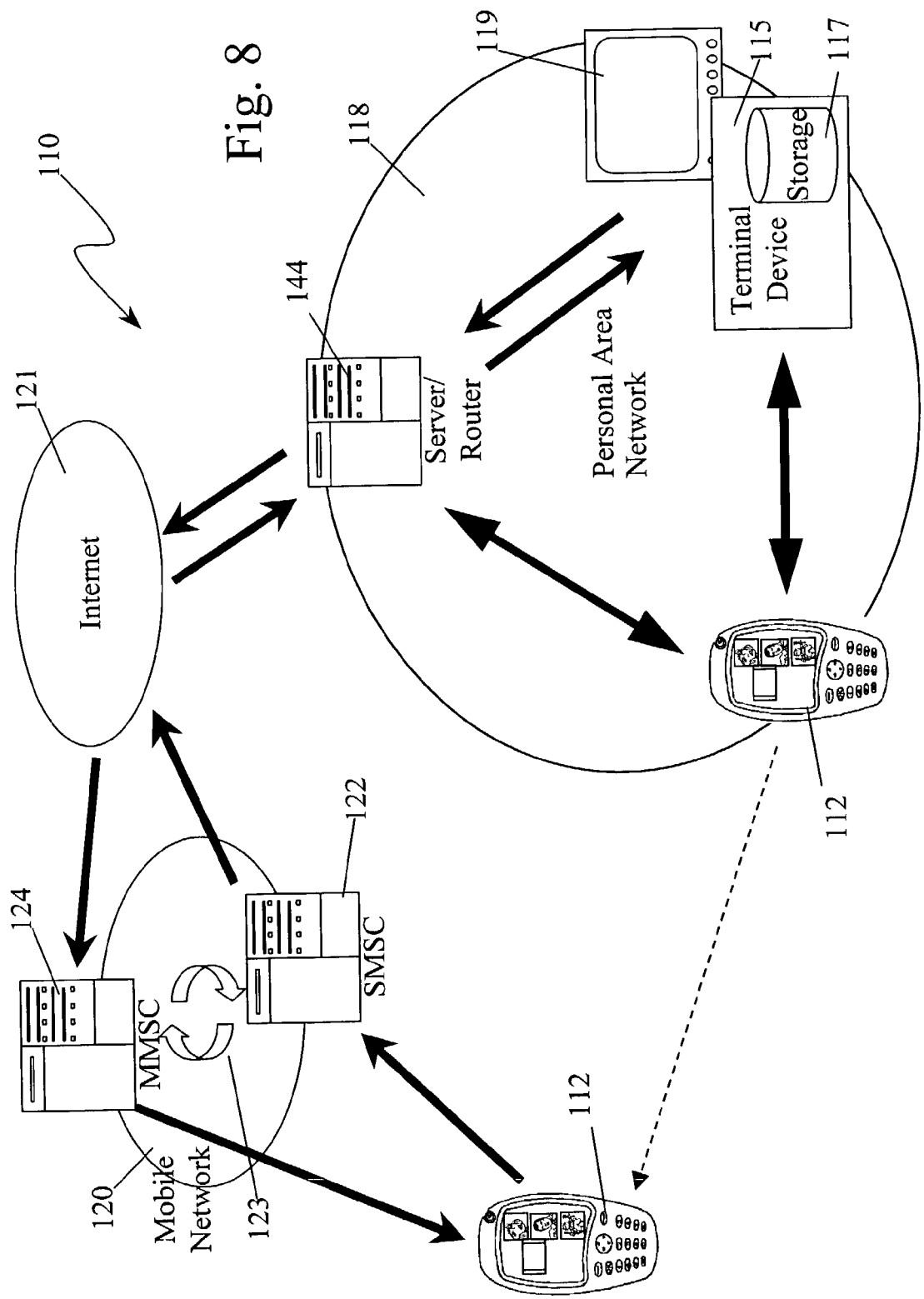

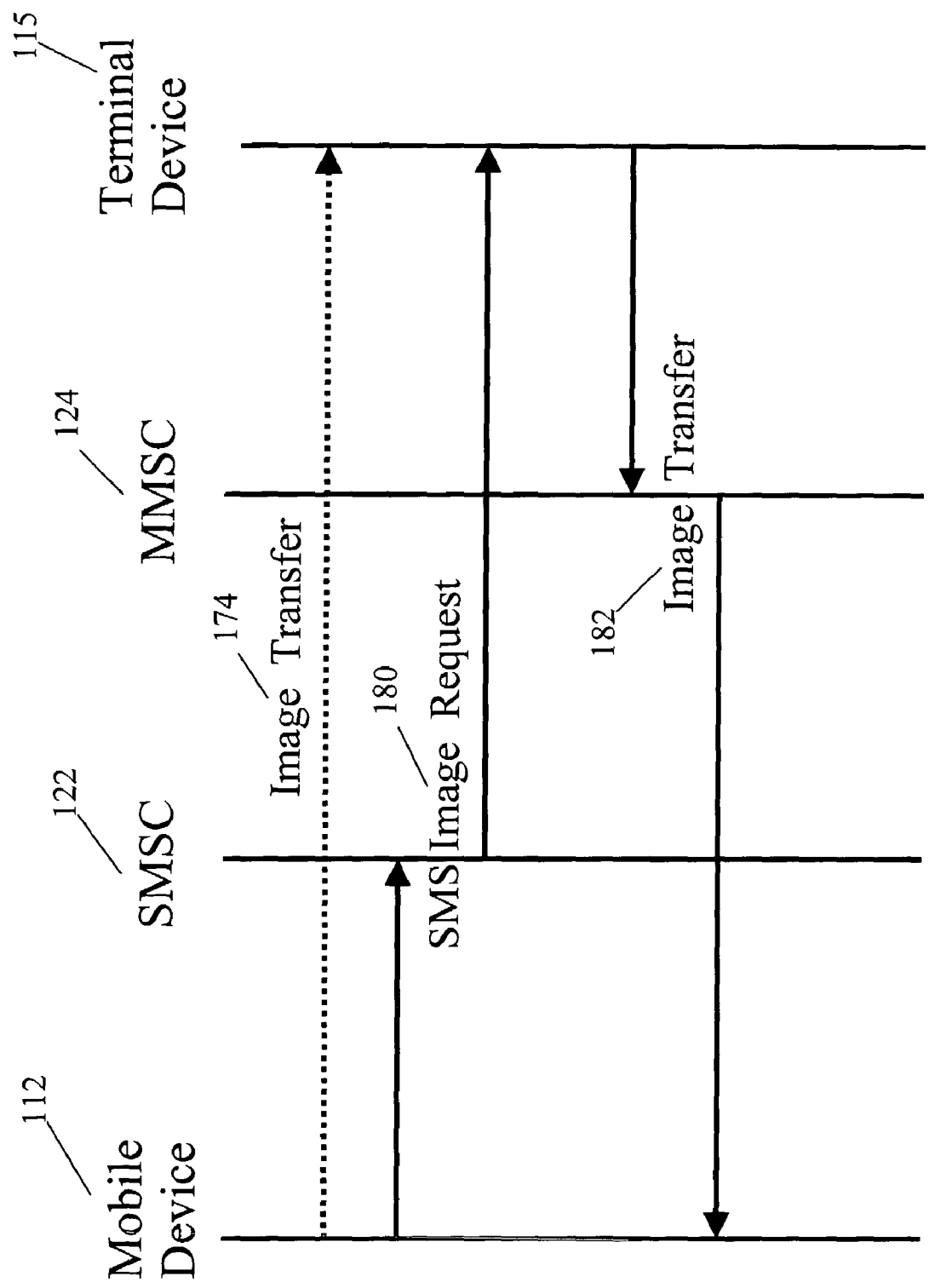

IMAGE BROWSING AND DOWNLOADING IN MOBILE NETWORKS

FIELD OF THE INVENTION

This invention relates generally to telecommunications networks. More particularly, the invention concerns systems and methods for browsing and managing images in a mobile network.

BACKGROUND OF THE INVENTION

A variety of mobile computing devices exist, such as personal digital assistants (PDAs), mobile phones, digital cameras, digital players, mobile terminals, etc., which can perform various functions specific to the device. The trend is for mobile devices to have combined functionality such that a single mobile device may, for example, provide Internet access, maintain a personal calendar, provide mobile telephony, and take digital photographs. Memory size, however, is typically limited on mobile devices and may become increasingly scarce as their functionality expands. One approach to managing memory constraints on mobile devices is to transfer files to another device, such as a personal computer or dedicated storage equipment.

Access to a personal computer or to dedicated storage equipment from a mobile device may be through a direct link, such as a universal serial bus connection (USB) or a removable storage card. However, it is more convenient for mobile devices to have access to file storage on these devices via wireless communications, such as via mobile telephony, a wide area network (WLAN), a BLUETOOTH communication system, and the like.

A network-enabled mobile device including a digital camera presents a combined functionality mobile device for which it may be desirable to remotely store files, such as digital images. Thus, local memory space may be preserved for capturing additional images. However, after the images are transferred, it may be desirable to browse previously captured images on the network-enabled mobile device and to view selected images. This may not be possible after the files are transferred to a remote device, or it may be expensive or time-consuming to access them on the remote device. Further, the mobile device may not know the IP address of the remote storage device or associated computer.

SUMMARY OF THE INVENTION

The present invention overcomes these difficulties by providing systems and methods for quickly browsing miniaturized versions of images stored locally on the network-enabled mobile device while allowing the associated full-size image to be quickly transferred to the mobile device as needed. Thus, local memory requirements are minimized and expenses associated with remote connectivity are greatly reduced. The user of a network-enabled mobile device according to the present invention may quickly browse a large number of images and view a full-size version of an image as desired.

In one embodiment of the invention, a method of viewing an image on a network-enabled mobile device includes the steps of storing a miniaturized version of the image in the mobile device, transferring the full-sized image to an external storage device, and deleting the full-sized image from the mobile device. In order to view the full-sized image, the user of the mobile device selects the miniaturized version of the image, and in response to the selection, the mobile device sends a wireless message to the external storage device requesting transfer of the full-sized image. The external storage device transfers the full-sized image to the mobile device in a second message and the mobile device is able to display the full-sized image. In one embodiment, SMS and MMS messages are used for requesting and transferring the full-sized image.

In other embodiments of the invention, computer-executable instructions for implementing the disclosed methods are stored on computer-readable media. Also, other embodiments of the invention include a mobile device equipped to carry out steps of the disclosed methods, as well as other computing devices equipped to support image transfers. Other features and advantages of the invention will become apparent with reference to the following detailed description and figures.

BRIEF DESCRIPTION OF THE DRAWINGS

The invention will be described in detail in the following description of preferred embodiments with reference to the following figures wherein:

FIG. 1 shows a wireless communication system that supports image browsing according to an embodiment of the present invention;

FIG. 2 shows a functional block diagram of a mobile device of FIG. 1;

FIG. 3 shows a functional block diagram of a server of FIG. 1;

FIG. 8 shows a wireless communication system that supports image browsing according to an embodiment of the present invention; and FIG. 9 shows message flows between various entities of the system of FIG. 8.

DETAILED DESCRIPTION OF THE INVENTION

Figure 4:
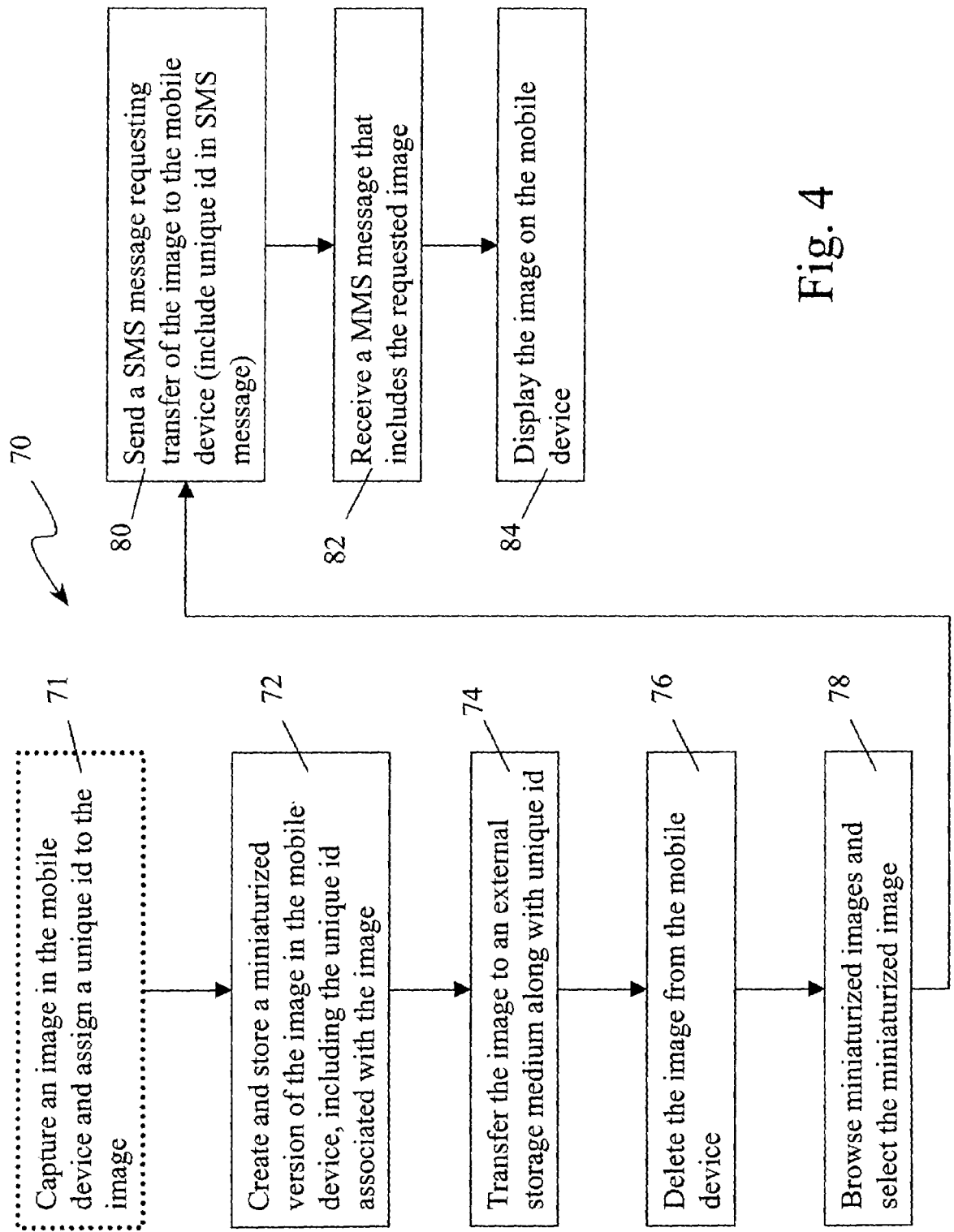
FIG. 4 shows steps in a method for viewing an image in a mobile device according to an embodiment of the present invention.

In the following description of the various embodiments, reference is made to the accompanying drawings that form a part thereof, and in which is shown by way of illustration various embodiments in which the invention may be practiced. It is to be understood that other embodiments may be utilized and structural and functional modifications may be made without departing from the scope of the present invention.

FIG. 1 shows a wireless communication system 10 that supports image browsing and transfer according to an embodiment of the invention. A network-enabled mobile device 12 (e.g. a PDA or mobile terminal) may be connected to a computer 14, such as a personal computer acting as a server for a home network 18, via a USB cable 16, a short-range wireless connection (e.g. BLUETOOTH), or other type connection. As such, mobile device 12 may transfer files to and from computer 14. The computer 14 may act as a repository for storing files related to mobile device 12. Computer 14 may have a wireless interface for transmitting and receiving messages as part of a mobile network 20, such as a cellular data communications network (e.g. GSM).

In one embodiment, the mobile device 12 includes wireless mobile communication capabilities that permit it to send and receive digital wireless communications within mobile network 20, such as a third-generation (3G) cellular data communications network or a Global System for Mobile communications network (GSM). As part of mobile network 20, a base station (not shown) supports digital communications with mobile device 12 while the mobile device is located within its administrative domain (not shown). The same or a different base station (not shown) of mobile network 20 is preferably in communication with computer 14. For simplicity, computer 14 and mobile device 12 are shown in communication with the same wireless communications network 20; however, one skilled in the art recognizes that a plurality of networks may be involved in communication paths between mobile device 12 and computer 14, including multiple cellular networks, wired networks, and/or other wireless communication networks (e.g. WLAN, BLUETOOTH).

Mobile device 12 may communicate with computer 14 via the mobile network 20 and may therefore be able to remotely access files stored on computer 14, such as files previously downloaded from the mobile device. This can provide advantages, such as preserving memory resources on mobile device 12 while allowing remote access to desired files. According to one embodiment, such file transfers may occur via Short Message Service (SMS) messages and Multimedia Messaging Service (MMS) messages via a short message service center (SMSC) 22 and a multimedia messaging service center (MMSC) 24. Although shown in network 20, SMSC and MMSC do not need to be located within network 20.

As shown in FIG. 2, mobile device 12 according to an embodiment of the invention includes a processor 26 connected to a keypad 28, a network interface 30, memory 32, a display 34, and a digital camera 36. Stored within memory 32 is software 33 that provides instructions to processor 26 for enabling mobile device 12 to perform various functions. For example, mobile device 12 may take digital photographs via digital camera 36 and browse the Internet using browser software 33 stored in memory 32 via network interface 30.

As shown in FIG. 3, computer 14 according to an embodiment of the invention includes a processor 46 connected to an interface 50 (e.g. a cellular wireless communications interface), memory 52, and storage 54. Stored within memory 52 is software 53 that provides instructions to processor 46 for enabling computer 14 to perform various functions, such as to process image transfer requests, store files in storage 54, and create miniaturized versions of images. Although shown as part of computer 14, storage 54 could be remote storage connected to computer 14, such as an external drive or another storage device in communication with computer 14.

FIG. 4 shows steps in a method 70 for viewing an image in mobile device 12 according to an embodiment of the present invention. In general, method 70 includes the steps of creating and storing 72 a miniaturized version of an image (not shown) stored in the mobile device 12, transferring 74 the full-sized image to an external storage device such as computer 14, and deleting 76 the full-sized image from the mobile device 12. In order to view the full-sized image, the user of mobile device 12 browses miniaturized images and selects 78 the miniaturized version of the image. In response to the selection, the mobile device 12 sends 80 a wireless message (such as a SMS message) to computer 14 requesting transfer of the full-sized image. Computer 14 subsequently transfers 82 the full-sized image to mobile device 12 in a second message and mobile device 12 displays 84 the full-sized image.

The method may also include the step of capturing 71 the full-sized image in the mobile device and assigning a unique identifier to the full-sized image. According to one embodiment, the image may be captured via digital camera 36 of mobile device 12. According to another embodiment, the image may be downloaded from the Internet or transferred from another device. For example, a user may scan hard copy photographs using computer 14 and transfer the images to mobile device 12.

As an example of method 70, suppose that digital camera 36 of mobile device 12 is capable of taking a 4.0 megapixel photographic image that occupies approximately 1 MB of memory. Suppose further that memory 32 of mobile device 12 has a capacity of approximately 64 MB. If the full capacity of memory 32 is available for storing images captured by digital camera 36, a user may take up to 64 pictures before exceeding the memory capacity of mobile device 12. Suppose that the user had taken 64 photographs and stored all 64 associated images on mobile device 12. In order to clear memory space for taking additional photographs, the user may remove some of the images from memory 32.

Suppose that the user manually removes the images by transferring the images via USB connection 16 to computer 14. Typically, the user would not be able to subsequently browse and view the images on mobile device 12 unless the images are transferred back to mobile device 12. However, according to an embodiment of the present invention, mobile device 12 (via instructions from software 33) creates 72 a miniaturized version of each image and stores them in memory 32 of the mobile device. A user may therefore browse the miniaturized versions locally on mobile device 12 without having to transfer each one of the images for viewing. If the user desires to view a full-sized image associated with a miniaturized version, he may select 78 the miniaturized version, which causes the mobile device 12 to request the transfer 80 of the associated full-sized image via wireless communication (e.g. mobile network 22) from computer 14.

A miniaturized version of an image as used herein may be an image having a smaller size or a lower resolution than the parent full-sized image. A thumbnail version is a particular example of a miniaturized version known in the art. A miniaturized version of an image may also have a smaller size or lower resolution than a transcoded version of an image optimized for viewing on mobile device 12. For example, an image originally transferred to mobile device 12 via a MMS message (e.g. sent from another mobile device) may be transcoded (e.g. converted to a lower resolution) at MMSC 24 for optimal viewing on mobile device 12. A miniaturized image of the transcoded image could be a thumbnail image having lower resolution than the transcoded image, which thereby requires minimal storage space. In other examples, a miniaturized version may be a cropped version of a full-sized image, have a reduced number of colors, contain fewer pixels, have higher compression, or otherwise have a smaller size or resolution than the parent full-sized. In a further example, a 256-color version of an image may be a miniaturized version of an image having millions of colors. As another example, a compressed image saved in a JPEG format may be a miniaturized version of a bitmap image originally stored on mobile device 12.

As an additional example, a miniaturized version may include a scaled copy of a full-sized image captured on mobile device 12 via a built-in camera. For instance, a miniaturized version of a captured 4.0 megapixel image may have a scale of $1/100$ of the original image, or in other words, be around 40,000 pixels in size. Such a miniaturized version may be about 200 pixels by 200 pixels in size. Although the ratio in file sizes may not be direct, suppose that the miniaturized version of a 4.0 megapixel photograph saved as a 1.0 MB JPEG image is around 10 KB in the same JPEG format. As such, 64 MB of memory in mobile device 12 would hold approximately 6,400 miniaturized images. In another example, a miniaturized version may have a scale of $1/10$ of the parent image. As such, 64 MB of memory would hold approximately 640 miniaturized images.

Figure 5:
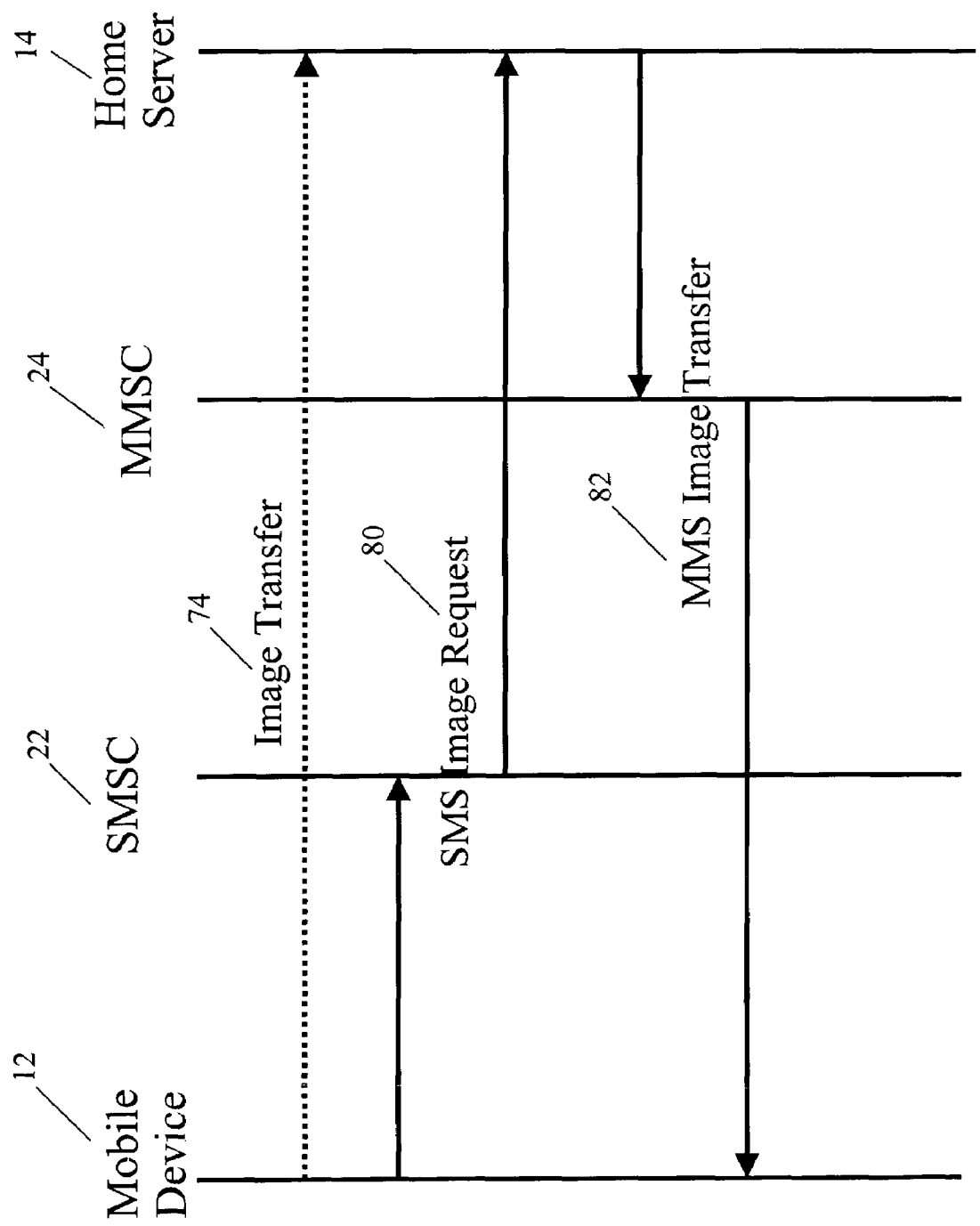
FIG. 5 shows message flows between various entities of the system of FIG. 1.
Figure 6:
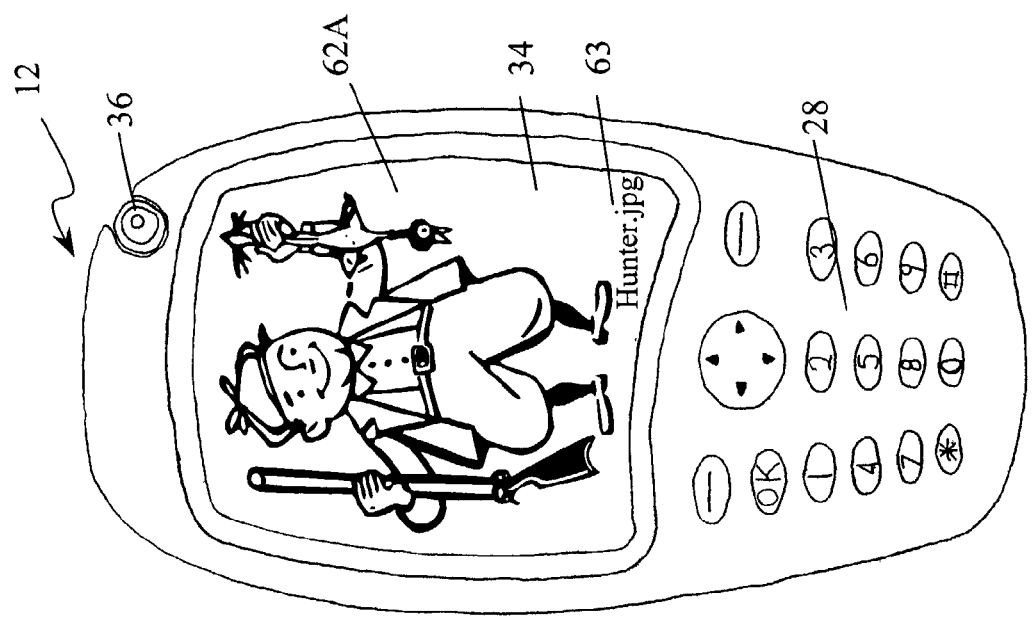
FIG. 6 shows a mobile device having a display associated with image browsing according to an embodiment of the present invention.
Figure 7:
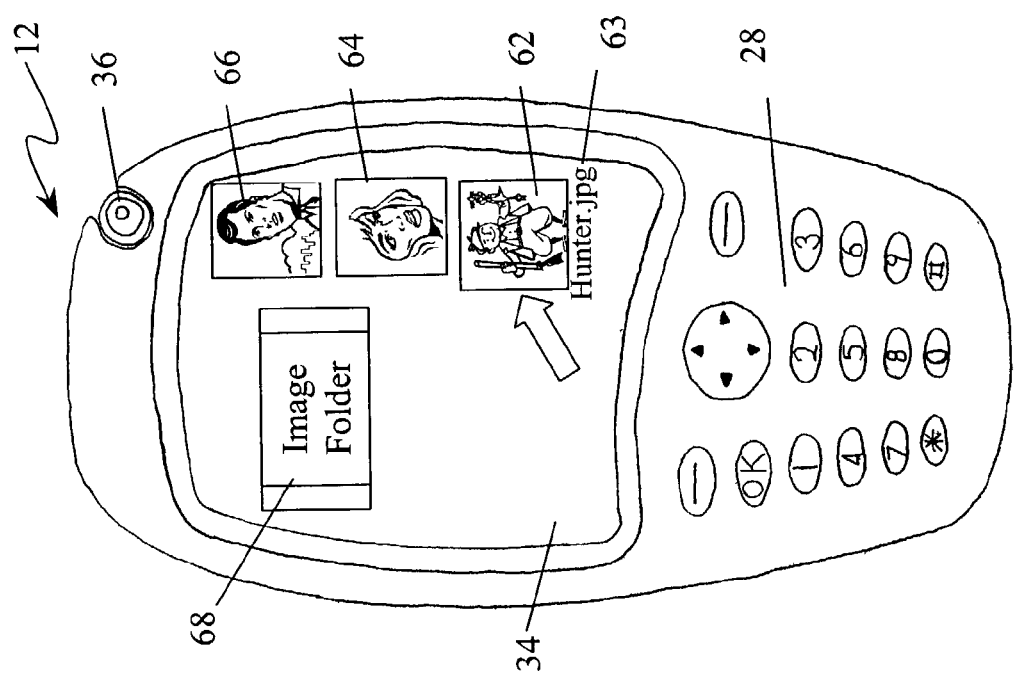
FIG. 7 shows an image display on the mobile device of FIG. 6 according to an embodiment of the invention.

As an example, FIGS. 5–7 further illustrate method 70 according to an embodiment of the invention. FIG. 5 shows message flows involving mobile device 12, a short message service center (SMSC) server 22 in mobile network 20, a multimedia messaging service center (MMSC) server 24 in mobile network 20, and computer 14 (e.g. a home server) as part of method 70. FIG. 6 shows a sample image display on mobile device 12 associated with a user browsing miniaturized versions 62, 64, 66 of images. FIG. 7 shows a sample display on mobile device 12 of a full-sized image 62A selected for viewing by the user.

As shown in FIG. 5, images (not shown) may be transferred to computer device 14 via USB connection 16. The transfer may be triggered manually, or via options in software 33, which may trigger automatic actions for transferring the images. For example, suppose mobile device 12 is connected via short-range wireless communication (e.g. BLUETOOTH communications within a personal area network 18) to computer 14. Suppose that a user has previously selected an option to transfer all images stored on mobile device 12 to computer 14 when the memory is 50% full or greater. As such, after the user has taken 32 pictures, mobile device 12 may automatically transfer the images to computer 14. Other options, such as transferring files at a particular time of day or the automatic transfer of each image as captured may also be selected. Whether via a wireless connection, direct connection, or other means (e.g. memory card transfer), the step of image transfer 74 occurs as images stored on mobile device 12 are transferred to storage 54 via computer 14.

Prior to or at the time of transfer, mobile device 12 performs the step of creating 72 a miniaturized version of each transferred image. The miniaturized versions are created in accordance with software 33 and may include options such as scale (e.g. $1/10$, $1/100$), compression, and file type (e.g. JPEG, GIF, TIFF, etc.). As illustrated in FIG. 6, suppose that a user has taken three photographs via digital camera 36, which have been previously stored as images in memory 32. Suppose further that the user has transferred the images to computer 14 and that miniaturized versions 62, 64 and 66 are stored in memory 32 as part of image folder 68. Suppose also that software 33 permits the user to browse 78 miniaturized versions 62, 64, 66, and upon selection of a miniaturized version, to request and display the associated full-sized image. Accordingly, suppose that the user operates keypad 28 to browse the miniaturized versions 62, 64, 66, and to select miniaturized version 62.

Upon selection of miniaturized version 62, mobile device 12 sends 80 a request for the associated full-sized image to computer 14, which preferably includes a unique identifier. In one embodiment, the software 33 assigns a unique identifier 63 to each image prior to or at the time of transfer, and includes this unique identifier in the associated miniaturized version of the image. The unique identifier may be a code, such as number or a time/date indication. It may also be a default name given to the image or a name input by the user. The unique identifier is preferably included in any requests for the associated full-sized image.

In one embodiment, the request is a short text message 25 that includes the unique identifier 63. For example, such a request may be in the format known as short messaging service (SMS). In accordance with SMS, the short text message 25 is sent to the SMSC 22, which forwards the message to computer 14 and confirms message delivery to mobile device 12. The use of SMS provides several advantages. For example, mobile device 12 may not know the IP address of computer 14; however, if both mobile device 12 and computer 14 have subscriptions for SMS supported by SMSC 22, SMSC 22 will relay messages between the two based on cell phone numbers or other identifiers.

SMS provides other advantages related to content of the SMS message. Because SMS messages include text, identification information or other information may be included in the message. For example, software 33 may be programmed such that the phone number or other identification information (e.g. MAC address, user name, password, etc.) may be included in the SMS request message 25. Based on the identification information, computer 14 may choose to process or reject the image transfer request. In one example, computer 14 may be set up to respond to image transfer requests from a pre-determined group of phone numbers, such as a family of cell phones.

Upon reception of the image request, computer 14 takes steps according to its programming for transferring 82 the associated full-sized image to mobile device 12 via mobile network 22. In one embodiment, the full-sized image is transferred in the message format known as multimedia messaging services (MMS). The computer 14 is able to determine the associated full-sized image by comparing the unique identifier(s) included in the image transfer message to the unique identifier(s) stored in storage 54 for each of the images. Once identified, computer 14 may create a MMS message (not shown) containing the requested image (as well as corresponding audio, text, and video as appropriate) and forward the message to MMSC 24. MMSC 24 transcodes the requested image as necessary based, for example, on the capabilities of mobile device 12 and QoS (e.g. bandwidth) of wireless communication between MMSC 24 and mobile device 12.

Although shown as separate logical entities, it is understood that SMSC 22 and MMSC 24 may be a single entity. Further, SMSC 22 and MMSC 24 may coordinate via signaling 23 between themselves for improving the image transfer process. For example, because SMS and MMS are store and forward systems, rather than real time systems, an image requested via a SMS message from mobile device 12 may still reside on MMSC 24 based upon a previous request. As such, SMSC 22 may copy MMSC 24 on a SMS image request and, if applicable, MMSC 24 can notify the user of the previously stored image. Further, MMSC 24 may simply transfer the requested image based on its stored copy of the image. In other embodiments, MMSC 24 may act as a repository for images and mobile device 12 may simply request transfer of full-sized images from the MMSC 24.

Upon reception of the MMS message, software 33 instructs mobile device 12 to display the full-sized image.

FIGS. 6 and 7 illustrate the steps of browsing and selecting 78 the miniaturized image and displaying 84 the associated full-sized image. As illustrated, the user browses miniaturized images 62, 64, 66 and selects miniaturized image 62, which has the unique identifier "hunter.jpg" associated therewith. In response to the selection, software 33 creates and sends 80 via wireless communications to computer 14 a SMS message that includes identifier "hunter.jpg." Upon reception 82 of the associated full-sized image 62A, as shown in FIG. 7, mobile device 12 displays 84 the image on display 34.

Software 33 stored in memory 32 preferably allows the user to choose a number of options for browsing, transferring, and viewing images according to the present invention. For example, as discussed above, preferences for triggering image transfer may be chosen. Other options, such as establishing a limit on the storage space may be selected. For instance, the user may choose to limit the cache or storage size of miniaturized images to 8 MB, or perhaps to the most recent 1000 miniaturized images. Further, software 33 may permit the user to flag certain miniaturized images as important such that they will be retained until the flag is removed or the miniaturized image is deleted.

The present invention further considers employing mobile device 12 as a remote control device for removing images stored on computer 14, changing settings on software 53 stored on computer 14, or for taking other such actions. These controls may be made via SMS messaging or other types of messaging. Further, they may be accomplished via wireless communication or direct communication with computer 14, such as via USB cable 16.

The method 70 according to the present invention provides many advantages. A user of the mobile device 12 according to the present invention may quickly browse miniaturized versions of images stored locally on mobile device 12 without incurring connectivity expenses. Further, the user avoids delays associated with remotely browsing the images stored on computer 14. Such delays may be associated with low bit rates of a particular connection. Also, wireless cellular connectivity may not be available in all geographical areas. In such an instance, a user may browse miniaturized versions of images while connectivity is unavailable and any transfer requests may be processed when connectivity is restored. According to the present invention, the user may quickly and inexpensively browse miniaturized images, which contain sufficient resolution to recognize the image without having to sacrifice local storage space. Although discussed with regard to cellular type wireless communication, the advantages of the present invention may be employed in other types of wireless networks.

Referring now to FIGS. 8 and 9, a wireless communication system 110 is shown that supports image browsing and transfer according to an embodiment of the invention. The wireless communication system 110 is generally similar to wireless communication system 10 of previous embodiments, except for aspects related to personal area network 118. As an example of other embodiments, SMS and MMS messaging communication paths include communications via the Internet 121. Personal area network 118 includes a computer 114 (which may act as a server or router for the personal area network), a terminal device 115, and a network-enabled mobile device 112, which are each connected to one another via wireless communications, such as communications according to the specification known as BLUETOOTH (see www.bluetooth.com).

Accordingly, mobile device 112 may wirelessly transfer images to terminal device 115, which may act as a repository for the image files. Suppose that terminal device 115 is a digital broadcast receiver in communication with a display device, such as television 119. Suppose further that terminal device 115 includes storage 117 for storing images. Suppose also that digital broadcast receiver 115 includes software for transferring images to and from mobile device 112 as requested, as well as for displaying the images on television 119. As such, the user may manage, store, and view images using receiver 115. Further, when mobile device 112 is located within personal area network 118, the mobile device 112 may browse and view images stored on receiver 115 via high-speed, inexpensive, communications within the personal area network 118.

As mobile device 112 moves outside of personal area network 118, it may access images stored on receiver 115 (or on computer 114 or both) as needed via method 70 described with regard to other embodiments. Additionally, as mobile device 112 moves within personal area network 118, it may continue to browse miniaturized versions of images stored locally thereon. This provides the user with a quick method of browsing images that reduces computing demands on mobile device 112 even when high-speed connections are readily available. As shown in FIG. 9, according to such an embodiment, a user may transfer an image (not shown) stored on the mobile device 112 to receiver 115 via BLUETOOTH communications. Prior to or along with transferring the image, a miniaturized version (not shown) of the image is stored in the mobile device 112, as described previously. After the user browses and selects the miniaturized version, mobile device 112 sends 180 via BLUETOOTH communications an image request. In response, receiver 115 transfers 182 the full-sized image (not shown).

While the present invention has been described in connection with the illustrated embodiments, it will be appreciated and understood that modifications may be made without departing from the true spirit and scope of the invention. In particular, the invention applies to almost any type of network and to a variety of different communication protocols and systems.

I claim:

1. A method of viewing an image on a mobile device, the method comprising the steps of:
   storing in the mobile device a miniaturized version of an image being stored in the mobile device;
   transferring the image to an external storage device;
   deleting the image from the mobile device;
   detecting selection of the miniaturized version of the image;
   in response to detecting selection of the miniaturized version of the image, sending via a wireless communication network a first message requesting transfer of the image to the mobile device; and
   receiving a second message via the wireless communication network transferring the image to the mobile device.

2. The method of claim 1, wherein for the step of sending via a wireless communication network the first message comprises a short text message.

3. The method of claim 2, wherein the short text message comprises a message in the format known as Short Messaging Service (SMS).

4. The method of claim 3, wherein the short text message comprises a mobile device identifier.

5. The method of claim 4, wherein the mobile device identifier comprises a phone number for the mobile device.

6. The method of claim 1, wherein for the step of sending via a wireless communication network the first message comprises a multimedia message.

7. The method of claim 6, wherein the multimedia message comprises a message in the format known as Multimedia Messaging Service (MMS).

8. The method of claim 1, wherein the step of detecting selection of the miniaturized version of the image comprises the steps of:
  browsing a plurality of miniaturized images stored on the mobile device; and
  receiving an input message choosing the miniaturized version of the image from the plurality of miniaturized images.

9. The method of claim 1, wherein the method further comprises the step of capturing the image.

10. The method of claim 9, wherein the mobile device comprises a digital camera and the step of capturing the image comprises taking a digital picture.

11. The method of claim 9, wherein the step of capturing the image comprises the step of downloading the image.

12. The method of claim 1, wherein the image has an identifier and the first message includes the identifier.

13. The method of claim 1, wherein the mobile device comprises a mobile terminal.

14. The method of claim 13, wherein the mobile terminal comprises a mobile telephone.

15. The method of claim 1, wherein the miniaturized image comprises a scaled version of the image having a scale of about $\frac{1}{10}$ to $\frac{1}{100}$ of an original size of the *image*.

16. The method of claim 1, wherein for the steps of sending and receiving, the wireless communication network comprises a mobile cellular communication network.

17. The method of claim 1, wherein for the steps of sending and receiving, the wireless communication network comprises a personal area network.

18. The method of claim 1, wherein for the step of transferring, the external storage device comprises a digital broadcast receiver.

19. The method of claim 1, wherein for the steps of sending and receiving, the mobile device is located in a different geographical area than the external storage device.

20. The method of claim 1, wherein the step of transferring the image occurs automatically in response to detection of a memory usage level meeting a threshold.

21. The method of claim 1, wherein the step of storing the miniaturized version of the image in the mobile device is performed prior to the step of transferring the image to the external storage device.

22. The method of claim 1, further comprising displaying the miniaturized version of the image for user selection in a menu including a plurality of miniaturized images, each miniaturized image of the plurality of miniaturized images being a miniaturized version of a corresponding image stored on the external storage device.

23. The method of claim 1, wherein the step of transferring the image to the external storage device is performed without transferring the miniaturized version of the image to the external storage device.

24. At a computer acting as an image repository, a method of viewing an image on a mobile device, the method comprising the steps of:
  receiving an image from the mobile device;
  storing the image in a storage device;
  receiving a short text message from the mobile device via communication comprising wireless communication, the short text message comprising a request to transfer the image to the mobile device; and
  sending a multimedia message to the mobile device via communication comprising wireless communication, the multimedia message comprising the image.

25. The method of claim 24, wherein for the step of receiving a short text message, the short text message comprises a message in the format known as Short Messaging Service (SMS).

26. The method of claim 24, wherein for the step of sending a multimedia message, the multimedia message comprises a message in the format known as Multimedia Messaging Service (MMS).

27. The method of claim 24, wherein the image has an identifier and the first message includes the identifier.

28. The method of claim 24, wherein for the steps of receiving a short text message and sending a multimedia message, the wireless communication comprises mobile cellular communication.

29. The method of claim 24 wherein for the step of storing the image in a storage device, the storage device comprises a digital broadcast receiver.

30. The method of claim 24, wherein for the steps of receiving a short text message and sending a multimedia message, the mobile device is located in a different geographical location than the storage device.

31. The method of claim 24, wherein the computer comprises a wireless communication interface and the steps of receiving a short text message and sending a multimedia message occur via the wireless communication interface.

32. A computer readable medium for storing computer readable instructions for performing steps on a mobile device for viewing an image, the steps comprising:
  storing in the mobile device a miniaturized version of an image stored in the mobile device;
  transferring the image to an external storage device;
  deleting the image from the mobile device;
  detecting selection of the miniaturized version of the image;
  in response to detecting selection of the miniaturized version of the image, sending via a wireless communication network a first message requesting transfer of the image to the mobile device; and
  receiving a second message via the wireless communication network transferring the image to the mobile device.

33. The computer readable medium of claim 32, wherein for the step of sending via a wireless communication network a first message, the first message comprises a short text message.

34. The computer readable medium of claim 32, wherein for the step of receiving a second message, the second message comprises a multimedia message.

35. The computer readable medium of claim 32, wherein the computer readable instructions perform the further step of capturing the image.

36. The computer readable medium of claim 32, wherein the step of storing the miniaturized version of the image in the mobile device is performed prior to the step of transferring the image to the external storage device.

37. The computer readable medium of claim 32, the steps further comprising displaying the miniaturized version of the image for user selection in a menu including a plurality of miniaturized images, each miniaturized image of the plurality of miniaturized images being a miniaturized version of a corresponding image stored on the external storage device.

38. The computer readable medium of claim 32, wherein the step of transferring the image to the external storage device is performed without transferring the miniaturized version of the image to the external storage device.

39. A computer readable medium for storing computer readable instructions for performing steps on a terminal device, the terminal device being in communication with a storage device, the steps being associated with viewing an image on a mobile device, the steps comprising:
receiving the image from the mobile device;
storing the image in the storage device;
receiving a short text message from the mobile device via communication comprising wireless communication, the short text message comprising a request to transfer the image to the mobile device; and
sending a multimedia message to the mobile device via communication comprising wireless communication, the multimedia message comprising the image.

40. The computer readable medium of claim 39, wherein the terminal device comprises a digital broadcast receiver.

41. A mobile device comprising:
a memory;
an input device;
a display;
at least one communication interface; and
connected to the memory, the display, and the at least one communication interface, a processor for performing the steps comprising:
storing in the memory a miniaturized version of an image stored in the memory;
transferring the image to an external storage device via the at least one communication interface;
deleting the image from the memory;
receiving input from the input device selecting the miniaturized version of the image;
in response to selection of the miniaturized version of the image, sending via wireless communication from the at least one communication interface a first message requesting transfer of the image to the mobile device; and
receiving via the at least one communication interface a second message via the wireless communication transferring the image to the mobile device.

42. The mobile device of claim 41, wherein the first message comprises a short text message.

43. The mobile device of claim 42, wherein the short text message comprises a message in the format known as Short Messaging Service (SMS).

44. The mobile device of claim 41, wherein the second message comprises a multimedia message.

45. The mobile device of claim 44, wherein the multimedia message comprises a message in the format known as Multimedia Messaging Service (MMS).

46. The mobile device of claim 41, further comprising a digital camera in communication with the processor, wherein the processor performs the further step of capturing the image via the digital camera.

47. The mobile device of claim 41, wherein the step of storing the miniaturized version of the image in the mobile device is performed prior to the step of transferring the image to the external storage device.

48. The mobile device of claim 41, the steps further comprising displaying the miniaturized version of the image for user selection in a menu including a plurality of miniaturized images, each miniaturized image of the plurality of miniaturized images being a miniaturized version of a corresponding image stored on the external storage device.

49. The mobile device of claim 41, wherein the step of transferring the image to the external storage device is performed without transferring the miniaturized version of the image to the external storage device.

50. A terminal device in communication with a mobile device, the communication comprising wireless communication, the terminal device comprising:
at least one communication interface;
a storage device; and
a processor in communication with the storage device, the at least one communication interface, and the storage device, the processor performing the steps comprising:
receiving an image from the mobile device via the communication interface;
storing the image in the storage device;
receiving a short text message from the mobile device via the at least one communication interface through communication comprising wireless communication, the short text message comprising a request to transfer the image to the mobile device; and
sending via the at least one communication interface a multimedia message to the mobile device through communication comprising wireless communication, the multimedia message comprising the image.

51. The terminal device of claim 50, wherein the terminal device comprises a digital broadcast receiver in wireless communication with the mobile device.

* * * * *